(12) United States Patent
Yustick et al.

(10) Patent No.: US 7,445,269 B2
(45) Date of Patent: Nov. 4, 2008

(54) STRUCTURAL STABILITY DEVICE FOR AUTOMOTIVE FRAME MEMBERS

(75) Inventors: Rob Yustick, West Bloomfield, MI (US); Jamil Alwan, Ann Arbor, MI (US); Geoff Cooper, Canton, MI (US); Matt Maser, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/638,882

(22) Filed: Dec. 14, 2006

(65) Prior Publication Data

US 2008/0143144 A1 Jun. 19, 2008

(51) Int. Cl.
   *B60J 7/00* (2006.01)
(52) U.S. Cl. .............................. 296/187.01; 296/203.03
(58) Field of Classification Search ............ 296/187.01, 296/30, 193.06, 203.03, 205, 203.01, 204, 296/29; 280/781, 798; 52/693, 639, 653.1, 52/169.7, 169.1
See application file for complete search history.

(56) References Cited

U.S. PATENT DOCUMENTS

| | | | | |
|---|---|---|---|---|
| 4,252,364 A * | 2/1981 | Toyama et al. | ......... | 296/203.01 |
| 4,682,812 A * | 7/1987 | Hurten et al. | .......... | 296/203.03 |
| 4,848,835 A * | 7/1989 | DeRees | ....................... | 296/204 |
| 5,052,742 A * | 10/1991 | Akoshima et al. | ....... | 296/203.02 |
| 5,171,058 A * | 12/1992 | Ishikawa | ................ | 296/187.12 |
| 5,246,264 A * | 9/1993 | Yoshii | .................... | 296/203.03 |
| 5,388,885 A * | 2/1995 | Warren | ................... | 296/203.03 |
| 5,443,297 A * | 8/1995 | Tanaka et al. | .......... | 296/203.03 |
| 5,476,303 A * | 12/1995 | Sakamoto et al. | ........... | 296/204 |
| 5,762,392 A * | 6/1998 | Suga | ...................... | 296/187.05 |
| 5,800,008 A * | 9/1998 | Gondo | ....................... | 280/751 |
| 5,810,428 A * | 9/1998 | Maki | ..................... | 296/203.02 |
| 5,829,824 A * | 11/1998 | Yamamuro et al. | .......... | 296/204 |
| 5,860,694 A * | 1/1999 | Seefried et al. | ........ | 296/203.03 |
| 6,247,287 B1 * | 6/2001 | Takabatake | ............ | 296/187.02 |
| 6,267,438 B1 * | 7/2001 | Jonsson | ................. | 296/203.03 |
| 6,309,011 B1 * | 10/2001 | Matsuyama et al. | .... | 296/187.05 |
| 6,328,376 B2 | 12/2001 | Son | ........................ | 296/203.03 |
| 6,394,536 B2 * | 5/2002 | Takahara | ................ | 296/187.05 |
| 6,397,553 B1 | 6/2002 | Horikawa et al. | .......... | 52/735.1 |
| 6,409,257 B1 * | 6/2002 | Takashina et al. | ........... | 296/209 |
| 6,416,113 B1 * | 7/2002 | Page | ........................ | 296/146.2 |
| 6,428,085 B1 * | 8/2002 | Miyasaka et al. | ....... | 296/187.12 |
| 6,474,726 B1 * | 11/2002 | Hanakawa et al. | ..... | 296/187.12 |
| 6,478,367 B2 * | 11/2002 | Ishikawa | ................ | 296/203.03 |
| 6,578,909 B1 * | 6/2003 | Reed et al. | ............. | 296/203.01 |
| 6,692,065 B2 * | 2/2004 | Yamamoto et al. | .......... | 296/205 |
| 6,705,668 B1 * | 3/2004 | Makita et al. | .......... | 296/187.03 |
| 6,817,654 B2 * | 11/2004 | Kitagawa et al. | ....... | 296/187.03 |
| 6,917,654 B1 | 7/2005 | Cerda | ......................... | 375/259 |

(Continued)

*Primary Examiner*—Kiran B. Patel
(74) *Attorney, Agent, or Firm*—Frederick Owens; Miller Law Group, PLLC (57) ABSTRACT

A vehicle structural frame member incorporates an internal lightweight brace member spanning between the opposing flanges of the co-joined hat-shaped members forming the structural frame member. The internal brace is formed of thin material, such as steel, to help the frame member retain its geometric shape when placed under a load. The internal brace can be formed into a ladder-like configuration with longitudinally spaced members that span between the opposing flanges to keep the geometric shape from collapsing. A substantial improvement in load carrying capability before collapse is obtained with a small increment in additional weight in the structural frame member.

13 Claims, 5 Drawing Sheets

U.S. PATENT DOCUMENTS

| | | |
|---|---|---|
| 6,976,730 B2 * | 12/2005 | Mally et al. ............. 296/203.03 |
| 6,988,763 B2 | 1/2006 | Sacki ..................... 296/187.12 |
| 7,021,700 B2 * | 4/2006 | Yoshida ................. 296/187.05 |
| 7,121,615 B2 * | 10/2006 | Hoshino ................ 296/203.03 |
| 7,152,914 B2 * | 12/2006 | Dingman et al. ....... 296/193.05 |
| 7,213,874 B2 * | 5/2007 | Osterberg et al. ........... 296/210 |
| 2002/0033618 A1 * | 3/2002 | Kwon ..................... 296/203.03 |
| 2004/0201253 A1 * | 10/2004 | Kitagawa et al. ....... 296/187.03 |
| 2005/0212326 A1 | 9/2005 | Marion .................. 296/187.03 |
| 2007/0246970 A1 * | 10/2007 | Widmann et al. ........ 296/190.1 |

* cited by examiner

STRUCTURAL STABILITY DEVICE FOR AUTOMOTIVE FRAME MEMBERS

FIELD OF THE INVENTION

This invention relates generally to an automotive frame member and, more particularly, to a stability device for maintaining a geometric profile during crush loading.

BACKGROUND OF THE INVENTION

Federal safety requirements require vehicles to withstand loads on the vehicle roof area for occupant safety and protection. These load requirements, expressed as a percentage of vehicle weight, increase as newer Federal requirements are established. The roof load requirements are intended to simulate loads on the vehicle encountered during a vehicle rollover event. Other frame members, such as upper and lower frame rails that extend generally longitudinally on the automotive frame, also experience crushing loads from crashes that result in the collapse of the frame member. The newer, more demanding Federal requirements force countermeasures, i.e. changes to the structure of vehicle body and frame, which can ultimately add significant cost and weight to the vehicle.

It is essential to minimize the weight of the vehicle, and thus the countermeasures adopted to meet the newer Federal safety requirements, as added weight to the vehicle frame translates into increased load requirements, as the requirements are expressed in terms of a percentage of the total vehicle weight. Increasing frame size is, therefore, a "Catch 22" type of situation in that the addition of structure to meet the load requirements of the newer regulations results in increased load requirements that must be resisted by the frame structure to satisfy the Federal requirements. Thus, conventional solutions required to meet the Federal safety requirements, by adding large, heavy steel reinforcements are counterproductive. The utilization of lighter weight materials and composites can offer equivalent vehicle frame structure that will withstand the required roof loads; however, these lightweight materials are typically substantially more expensive than conventional steel components, which make the cost of the vehicle frame prohibitively expensive and would render the vehicle commercially uncompetitive.

When the vehicle frame components are loaded through the roof, the vehicle body pillars and rail cross-sections achieve a peak loading and then proceed to collapse. In the process of collapsing, the frame cross-section changes geometric shape into a less stable cross-sectional profile. The progressing geometric shape change continues until the load carrying capability of the structural frame member is reduced below the buckling threshold, where collapse occurs.

The conventional approach to increasing the load carrying capacity of a vehicle structural frame member can be seen in U.S. Pat. No. 6,328,376, issued to Baik-Lark Son on Dec. 11, 2001, in which a reinforcing member that cooperates with a stepped portion of the reinforcing panel in a manner to delimit the closed space and increase the overall rigidity of the center pillar. Similarly, a reinforcing panel is added to the vehicle structural frame member formed from two hat-shaped components to increase the weight and the section of the structural member in U.S. Pat. No. 6,397,553, granted to Tooru Horikawa, et al on Jun. 4, 2002.

A reinforcement for a vehicle roof rail and center pillar is placed between the inner and outer panels of the structural member as taught in U.S. Pat. No. 6,705,668, issued on Mar. 16, 2004, to Masashi Makita, et al by welding flanges of the reinforcement member and inner and outer panels to each other, thus increasing vehicle rigidity. In U.S. Pat. No. 6,917,654, granted on Nov. 16, 2004, to Yuichi Kitagawa, et al, a pillar reinforcement panel has flanges that are pinched and welded between corresponding flange parts of inner and outer pillar pieces to increase pillar rigidity.

U.S. Pat. No. 6,988,763, issued on Jan. 24, 2006, to Hidetsugu Saeki, et al discloses a U-shaped energy absorbing section welded to the outside of a center roof pillar to provide structural integrity such that other members are deformed only after the energy absorbing section has completely deformed due to impact loading. The U-shaped reinforcement member can be welded to the inside surface of the outer pillar panel to provide an impact absorbing member. In U. S. Patent Application Publication No. 2005/0212326, by Thomas Marion, dated Sep. 29, 2005, a reinforcement member has three pivotable walls positioned within the vehicle structure defining a cavity, such as a roof assembly or a roof pillar in a vehicle.

It would be desirable to provide a stability device in a vehicle structural frame member that is operable to retain the geometric cross-sectional shape of the frame member while undergoing crash loading.

SUMMARY OF THE INVENTION

It is an object of this invention to overcome the aforementioned disadvantages of the known prior art by providing a stability device in a vehicle structural frame member so that the frame member will retain geometric shape during loading.

It is another object of this invention to provide an interior brace across the structural beam that prevents the profile from changing into a less stable configuration under load.

It is a feature of this invention to provide an interior brace spanning across the cross-sectional configuration of a vehicle structural beam.

It is an advantage of this invention that the interior brace helps the structural beam to maintain geometric shape while under load.

It is another advantage of this invention that the vehicle frame member is capable of sustaining increased loads before collapsing.

It is still another advantage of this invention that the increase in load capacity is obtained without a significant increase in weight for the vehicle structural frame member.

It is another feature of this invention that the structural frame member is formed from hat-shaped components welded together at opposing flanges.

It is still another feature of this invention that the opposing flanges are interconnected by a flat internal brace.

It is still another advantage of this invention that the flat internal brace is formed from relatively thin material to hold the spacing of the opposing flanges.

It is yet another advantage of this invention that the internal brace can be inserted into the structural frame member without increasing the overall dimensions of the frame member.

It is yet another feature of this invention that the internal brace can be formed into a ladder-like configuration with longitudinally spaced members spanning between opposing flanges on the structural frame member.

It is a further feature of this invention that the longitudinally spaced members of the internal brace can be located where collapse of the frame member is most likely to occur.

It is a further advantage of this invention that the internal brace functions to help the structural frame member to resist collapse.

It is a further object of this invention to provide a stability device for a vehicle structural frame member that is durable in construction, inexpensive of manufacture, carefree of maintenance, facile in assemblage, and simple and effective in use.

These and other objects, features and advantages are accomplished according to the instant invention by providing a vehicle structural frame member that incorporates an internal lightweight brace member spanning between the opposing flanges of the co-joined hat-shaped members forming the structural frame member. The internal brace is formed of thin material, such as steel, to help the frame member retain its geometric shape when placed under a load. The internal brace can be formed into a ladder-like configuration with longitudinally spaced members that span between the opposing flanges to keep the geometric shape from collapsing. A substantial improvement in load carrying capability before collapse is obtained with a small increment in additional weight in the structural frame member.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring to FIGS. 1-4, a structural frame member for use in an automotive vehicle and having a first embodiment of an internal brace incorporating the principles of the instant invention can best be seen. The structural frame member 10 is preferably placed in an automobile in a place that requires resistance to collapse due to the placement of loads thereon. Examples of such structural frame members 10 are roof pillars for the automobile, the roof rails, or the lower frame rails where impact or rollover loads can cause collapse of the structural frame member. Other examples of automotive structural frame members that can benefit from an adoption of the principles of the instant invention include: front and rear roof headers, roof bows, A-pillars, front hinge pillars, B-pillars, rockers, roof rails, front and rear longitudinal rails floor cross members, front upper rails, door beams, frame rails, C-pillars and D-pillars. Federal safety requirements for the frame of an automotive vehicle mandate that the roof be capable of resisting substantial loads, which are typically expressed as a percentage of the overall vehicle weight. Accordingly, the pillars and the roof rails must be capable of withstanding a specified load before collapsing under the loading imposed on the frame member.

Figure 1:
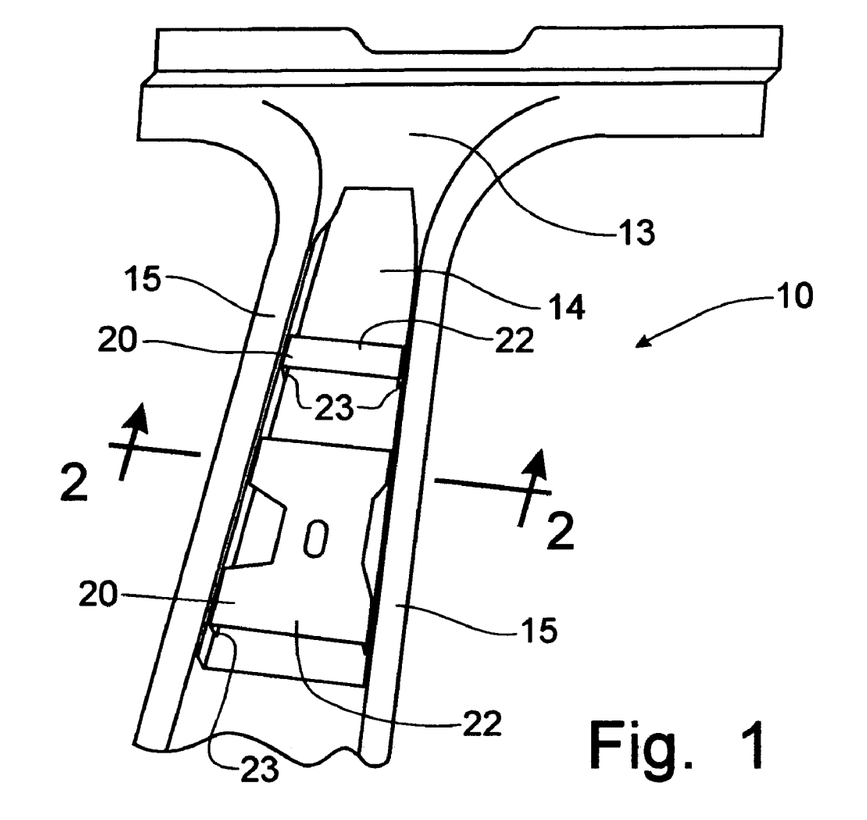
FIG. 1 is a perspective view of an automotive structural frame member, such as, but not limited to, a B-pillar, incorporating the principles of the instant invention.
Figure 2:
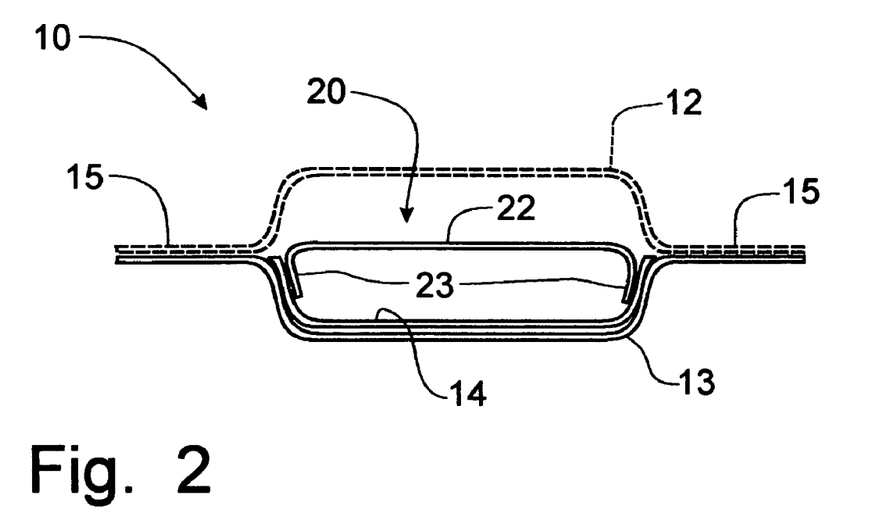
FIG. 2 is a cross-sectional view taken through the structural frame member in FIG. 1 corresponding to lines 2-2, the upper hat-shaped member being shown in to complete the structural frame member.
Figure 3:
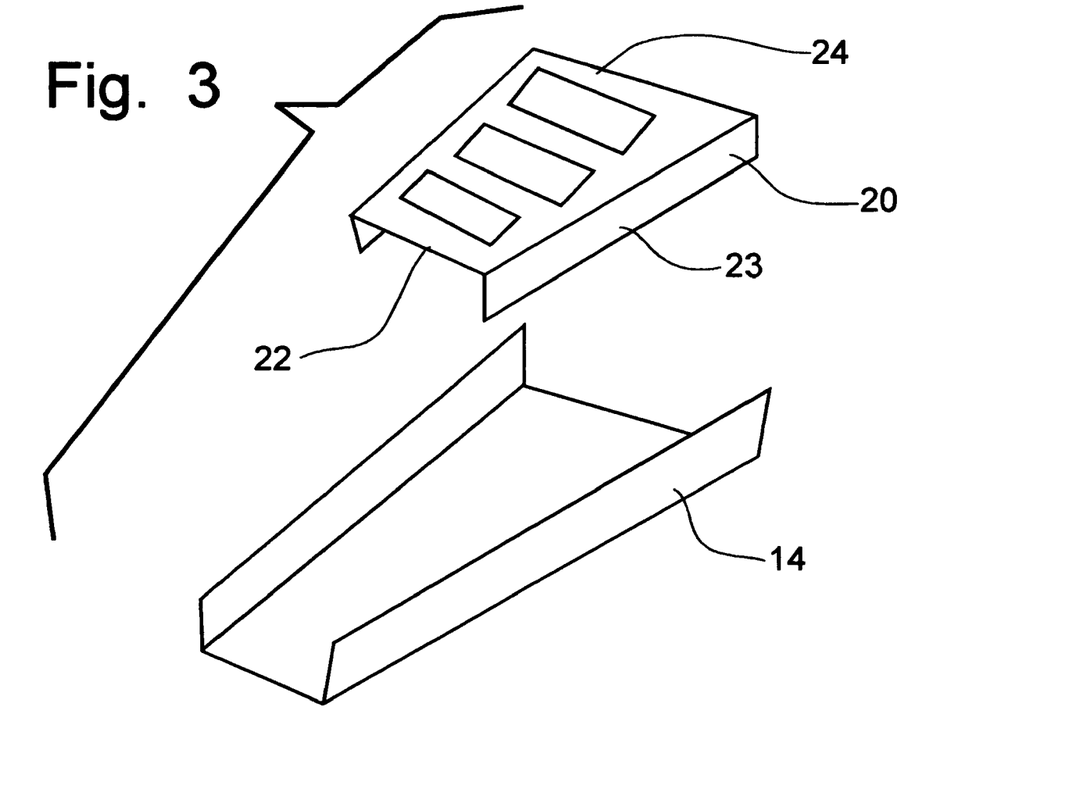
FIG. 3 is an exploded schematic perspective view of a first embodiment of the instant invention.
Figure 4:
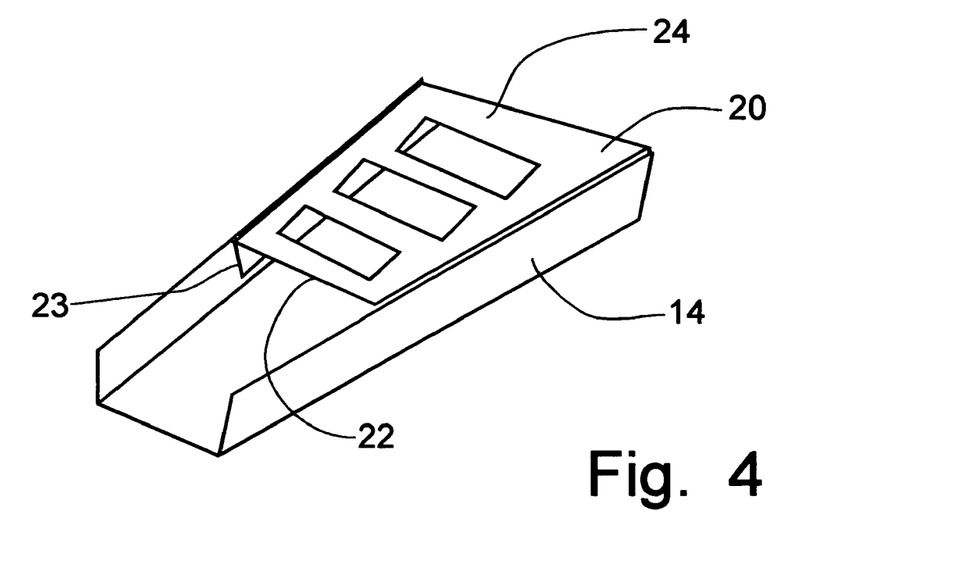
FIG. 4 is a perspective view of the first embodiment of the instant invention.

When the structural frame member is placed under loading, the geometric shape, best seen in a cross-section, such as is depicted in FIG. 2, undergoes a progressing change in shape or configuration, placing the frame member in a less stable configurations until the frame member collapses. This progressing change in geometric shape typically results in the opposing flanges 15 of the co-joined inner and outer hat-shaped members 12, 13, spreading apart to cause a reduction in the depth of the frame member's cross-section, and thereby lessening the ability in the frame member to carry a load. Conventional practice to increase the structural frame member's load carrying capacity is to add structural reinforcements, such as the reinforcement 14 placed into the outer hat-shaped member 13, as seen in FIGS. 1-4. These reinforcements 14 are welded to the outer hat-shaped member 13 to be operable as an integral part thereof While the addition of the reinforcement 14 adds more mass and weight to the frame member 10, and thereby increasing the difficulty for the geometric cross-section to change shape, sufficient loading will ultimately cause the shape to change and the load carrying capacity to decrease until collapse occurs. According to the principles of the instant invention, the structural frame member 10 can be formed with an internal brace 20 that spans across the center of the frame member to tie into the opposing flanges 15 to maintain the cross-sectional shape and configuration of the frame member 10.

A first embodiment of the invention is depicted in FIGS. 1-4 wherein the brace member 20 is in the form of a C-shaped member, similar to that of the reinforcement member 14, but turned oppositely of the reinforcement member 14 so that a central span 22 of the brace member 20 is substantially aligned with the center of the frame member 10 and extends from one transverse side of the frame member 10 to the other. In this first embodiment, the C-shaped brace member 20 has a pair of transversely opposed mounting legs 23 oriented generally perpendicularly to the central span 22 and positioned to be welded against the corresponding legs of the reinforcement member 14. In this first embodiment, the internal brace 20 interconnects the opposing sides of the frame member 10 next to the flanges 15 by welding the legs 23 to the reinforcement member 14, which in turn is welded to the outer hat-shaped member 13.

Accordingly, the brace member 20 keeps the frame member 10 from spreading transversely. With the legs 23 turned toward the outer hat-shaped member 13 to be welded to the reinforcement member 14, the brace member 20 does not increase the vertical spacing, i.e. the thickness dimension, at the flanges 15 of the frame member 10. Yet, the internal brace 20 will still serve to prevent the opposing flanges 15 from spreading apart while under load. As is noted in FIGS. 3 and 4, the internal brace member 20 is preferably formed in a ladder-like configuration with the central span 22 being formed as transversely extending rungs 24 interspersed by openings in the brace member 20 to keep the brace member 20 as light in weight as possible. The rungs 24 serve to maintain transverse spacing between the opposing flanges 15 without adding substantial weight to the frame member 10.

Figure 5:
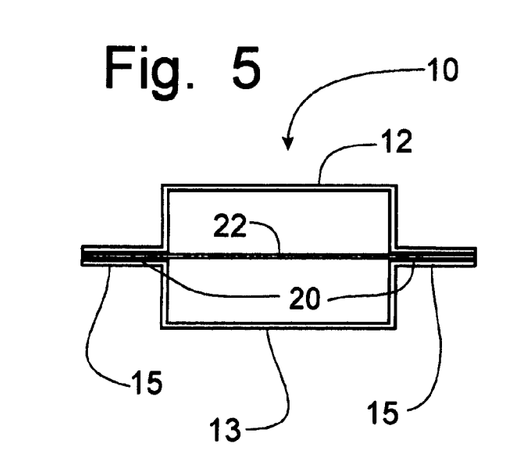
FIG. 5 is a cross-sectional view of a structural frame member, similar to that of FIG. 2, but depicting a second embodiment of the instant invention.
Figure 6:
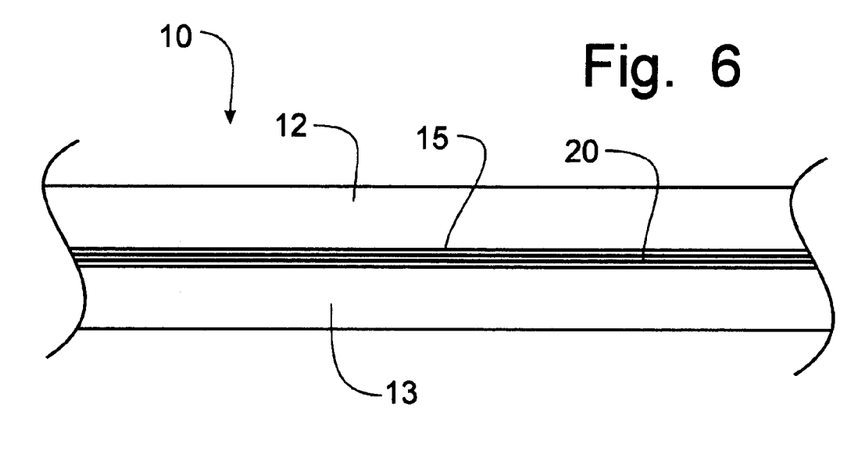
FIG. 6 is an elevational view of the structural frame member depicted in FIG. 5.
Figure 7:
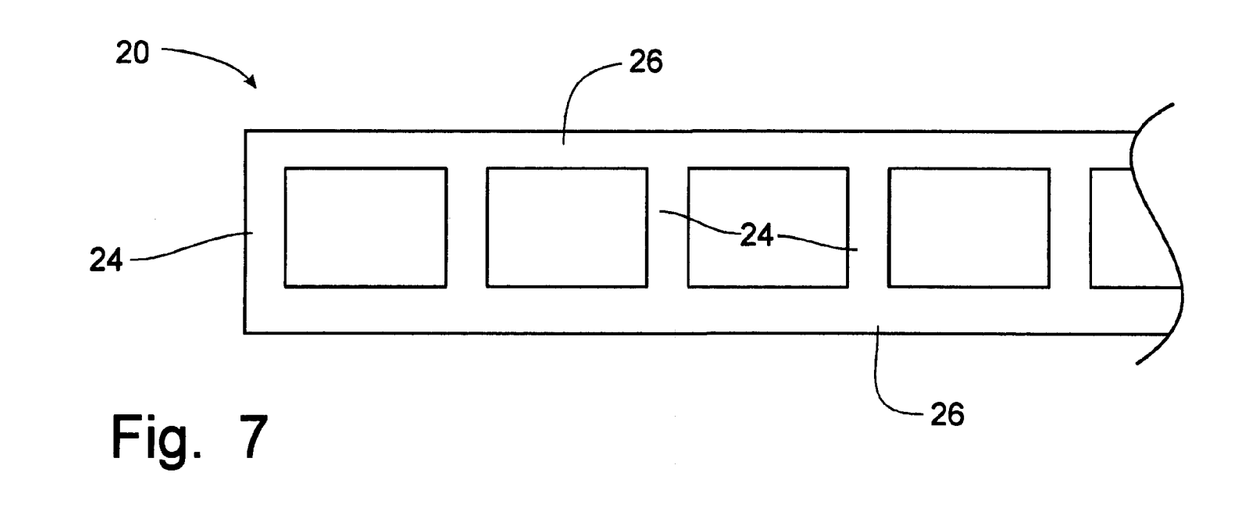
FIG. 7 is a plan view of the internal brace member utilized in FIGS. 5 and 6.
Figure 8:
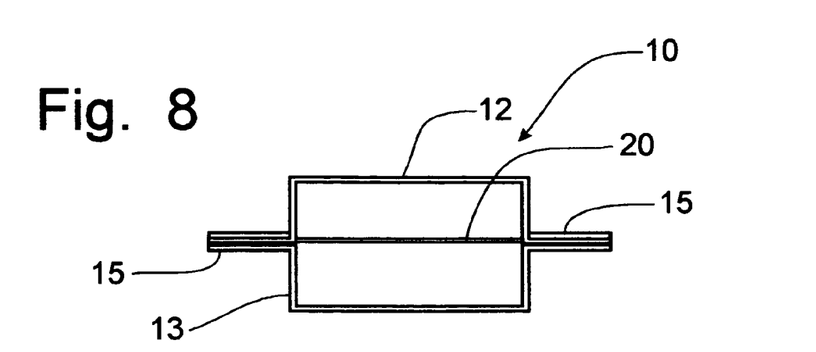
FIG. 8 is a cross-sectional view of a structural frame member, similar to that of FIG. 5, but depicting a third embodiment of the instant invention.
Figure 9:
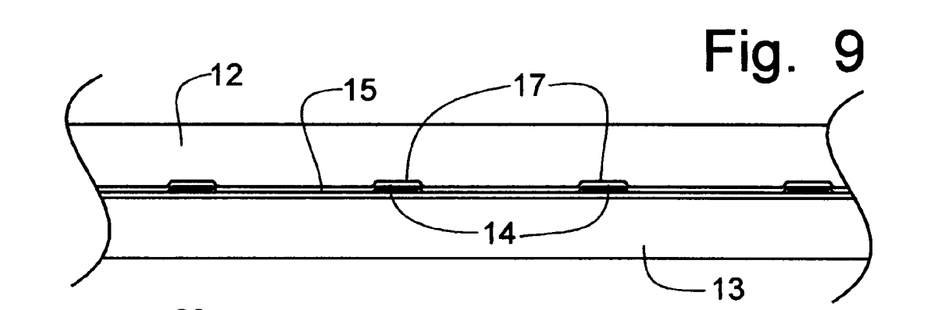
FIG. 9 is an elevational view of the structural frame member depicted in FIG. 8.

In FIGS. 5-7, a second embodiment of the internal brace member 20 is depicted. The second embodiment of the brace member 20 is similar in shape to the first embodiment in that the brace member 20 is formed in a ladder-like configuration with a pair of transversely spaced side portions 26 interconnected by a series of rungs 24 forming the central span 22 of the brace member 20. Instead of the side portions 26 forming legs that bend toward one of the hat-shaped members 12, 13 to be welded internally, the brace member 20 is generally planar and the side portions 26 are welded between the flanges 15 of the inner and outer members 12, 13. While FIG. 7 depicts the brace member 20 as being regularly formed with evenly spaced rungs 24, the rungs 24 could be positioned across the frame member 10 at irregularly spaced positions to be placed at the positions deemed to be the most likely locations in the frame member 10 to experience deformation under loading conditions.

Figures 10, 11:
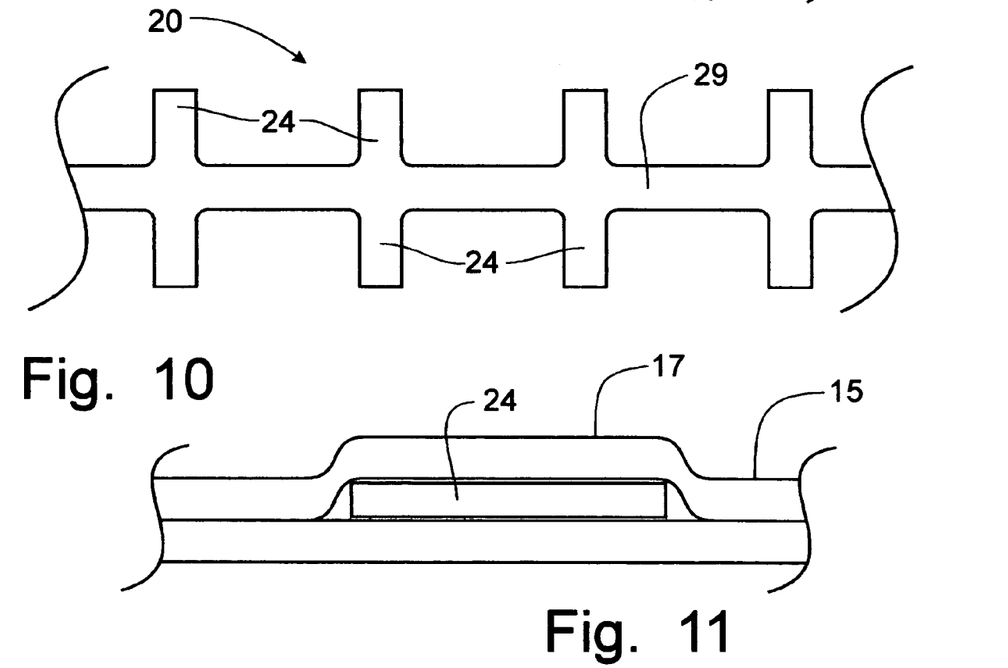
FIG. 10 is a plan view of the internal brace member utilized in FIGS. 8 and 9.
FIG. 11 is an enlarged partial elevational view of the structural frame member shown in FIG. 9.

A third embodiment of the brace member 20 is shown in FIGS. 8-11. In this structural frame member, such as a roof rail in which the flanges are formed with raised portions 17 to increase rigidity and provide a preferred mounting surface for chassis members (not shown) to be attached. Rather than the rungs 24 extending between opposing side members 26, as depicted in the first two embodiments shown in FIGS. 1-7, the rungs 24 project outwardly in a cantilevered manner from a center longitudinally extending support member 29 with opposing rung projections defining a rung 24 that extends between opposing flanges 15. The rung projections 24 are oriented and sized to fit within a corresponding raised portion 17 in the flange 15. As noted previously, the longitudinal spacing of the rungs 24 on the internal brace 20 do not need to be a regular spacing. Clearly, the preferred embodiment is to design the rung spacing to correspond to the raised portion spacing within which the rungs are to be welded. Since the internal brace member 20 needs only to be a thin stability device that is operable to prevent the opposing flanges 15 from spreading apart under load, the thin rungs 24 can fit within the gap beneath the inner member 12 at the formed raised portion 17, as is best seen in FIG. 11. Thus, the incorporation of the internal brace member 20 into the frame member 10 does not increase the thickness dimension of the flanges 15 of the frame member 10.

In all three embodiments, but particularly with respect to the planar configurations shown in FIGS. 5-11, the internal brace member 20 is a thin, preferably sheet metal, member that is welded to the opposing flanges 15. The purpose of the thin brace member 20 is not to reinforce, as the brace member 20 does not have sufficient mass to provide conventional reinforcement functions, but to stabilize the cross-sectional shape of the frame member 10 and prevent the flanges 15 from moving apart and causing the frame member to lose load carrying capability. Preferably, the thickness of the internal brace member 20 will be in the range of 0.7 mm to 1.2 mm, but could be as thin as 0.5 mm.

Figure 12:
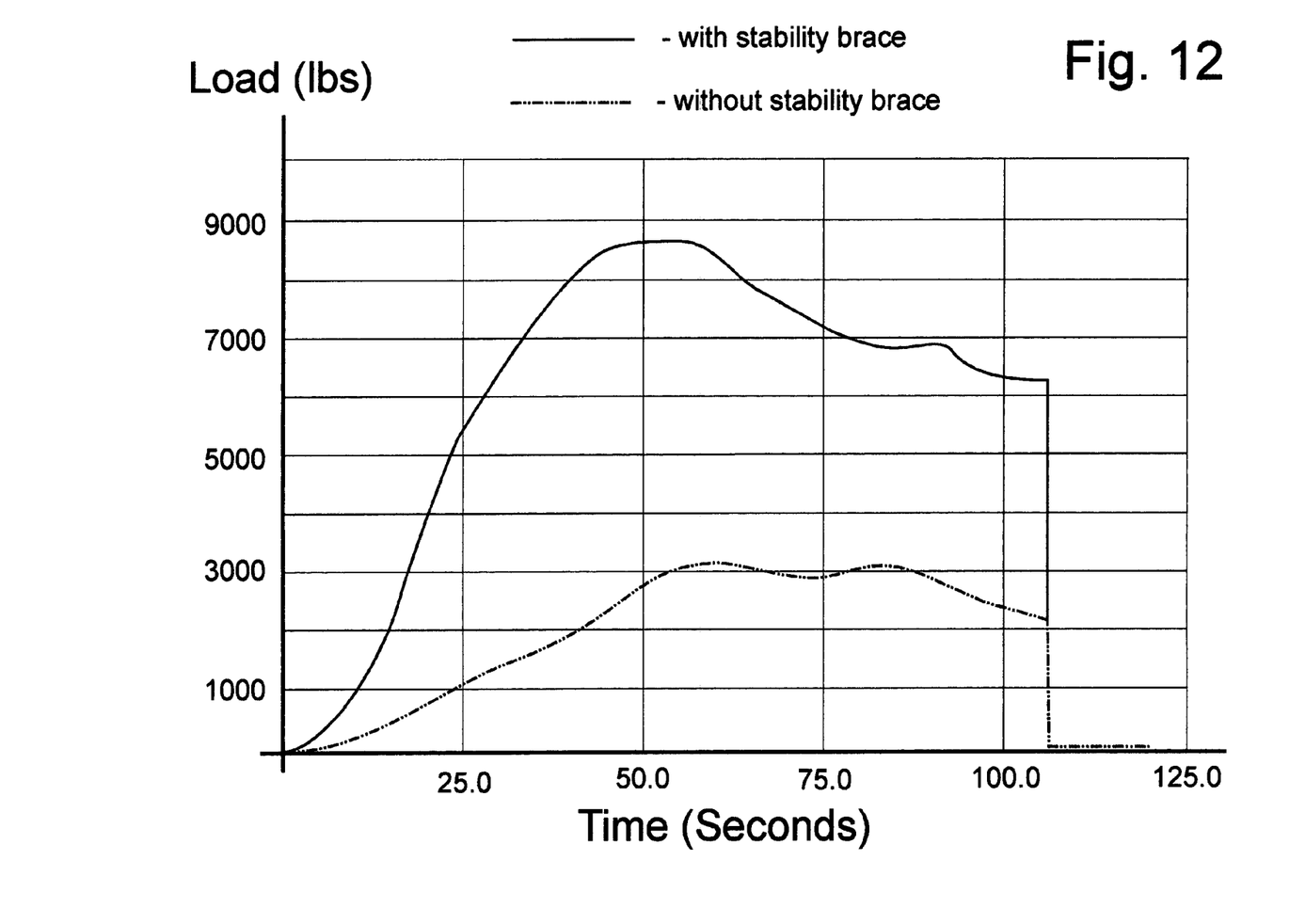
FIG. 12 is a graph depicting the load capability of a structural frame member having a stability device placed internally thereof compared to the load capability of a structural frame member not have the stability device incorporating the principles of the instant invention.

Clearly, the internal brace member 20 is strongest in tension, which is how the brace member 20 would be stressed if the flanges 15 try to spread apart. With the rungs 24 welded to the opposing flanges 15, the opposing flanges can't spread apart and reconfigure the cross-section into a less capable shape. In FIG. 12, a graph depicts the increased load carrying capability of a representative structural frame member 10 with and without the internal brace member 20. As can be seen in this graph, the utilization of the thin internal brace member 20 spanning between the opposing flanges 15 more than doubles the load carrying capability of the frame member 10, increasing the maximum load from about 3000 pounds to about 8500 pounds. The load at collapse increases from about 2000 pounds to about 6000 pounds. Accordingly, one skilled in the art will readily recognize the benefits of incorporating a structure stability device, such as the internal brace member 20 extending between the flanges 15 of the frame member 10.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of examples, the principles of the instant invention can be utilized in any type of thin shell structural span member found anywhere on an automotive vehicle body or frame. The internal brace member 20 can be as simple as a single thin span of metal placed appropriately across the center of a structural frame member to force the structural frame member to maintain its cross-sectional shape while under load. The internal brace member 20 can be used with conventional reinforcing members, such as is depicted in the aforementioned prior art documents, to achieve optimal performance results as required. One skilled in the art will understand that the principles of the instant invention are not limited to crush loads in the roof, as many other structural frame members are subjected to other crushing loads, such as impact loads, that will cause the structural frame member to change its geometric shape. Lastly, the principles of the instant invention are not limited to use on automotive structural frame member, and can be used on substantially any structural frame member subjected to a crushing load that will tend to deform the cross-sectional geometric shape of the frame member.

Having thus described the invention, what is claimed is:

1. A structural frame member, comprising:
   first and second shaped members welded together at laterally opposing flanges to define an interior cavity; and
   an internal brace member positioned within said cavity and spanning linearly between said opposing flanges to maintain a transverse spacing between said opposing flanges, said internal brace member being formed with spaced apart openings therein defining transversely extending linear rungs positioned between said openings and interconnecting said opposing flanges.

2. The structural frame member of claim 1 wherein said openings in said internal brace member includes opposing, transversely spaced side portions interconnected by said rungs.

3. The structural frame member of claim 2 wherein said side portions include corresponding attachment portions bent generally perpendicularly to said and being welded to opposing sides of one of said shaped members adjacent said flanges.

4. The structural frame member of claim 2 wherein said side portions are positioned between the flanges of said first and second shaped members and welded thereto.

5. The structural frame member of claim 1 wherein said internal brace member has a central longitudinally extending member with said rungs projecting laterally outwardly therefrom.

6. The structural frame member of claim 5 wherein said flanges are formed with raised portions, said rungs being sized to fit within said raised portions between said first and second shaped members.

7. The structural frame member of claim 5 wherein said rungs are irregularly spaced along said central longitudinally extending member.

8. In an automotive vehicle having a frame member formed from first and second shaped members secured at opposing flanges to define an internal cavity having a cross-sectional geometric shape, the improvement comprising:

an internal brace member positioned within said cavity and defining a linear member spanning between said opposing flanges to maintain a transverse spacing between said opposing flanges as said frame is placed under load, said internal brace member being formed with transversely extending linear rungs spaced apart by openings within said internal brace member, said rungs interconnecting said opposing flanges.

9. The automotive vehicle of claim 8 wherein said openings in said internal brace member define opposing, transversely spaced side portions interconnected by said rungs.

10. The automotive vehicle of claim 9 wherein said side portions include corresponding attachment portions bent generally perpendicularly to said rungs and being welded to opposing sides of one of said shaped members adjacent said flanges.

11. The automotive vehicle of claim 8 wherein said side portions are positioned between the flanges of said first and second shaped members and welded thereto.

12. The automotive vehicle of claim 8 wherein said internal brace member has a central longitudinally extending member with said rungs projecting laterally outwardly therefrom.

13. The automotive vehicle of claim 12 wherein said flanges are formed with raised portions, said rungs being sized to fit within said raised portions between said first and second shaped members.

* * * * *